Feb. 11, 1969 J. WINZEN 3,426,910
PLEATED METALLIC FILTER ELEMENT
Filed Jan. 4, 1965
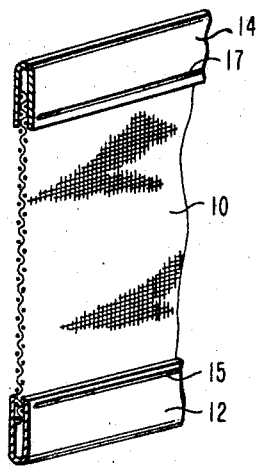
FIG.—1
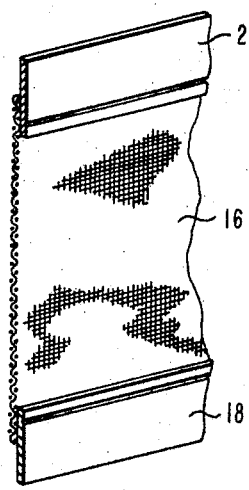
FIG.—2
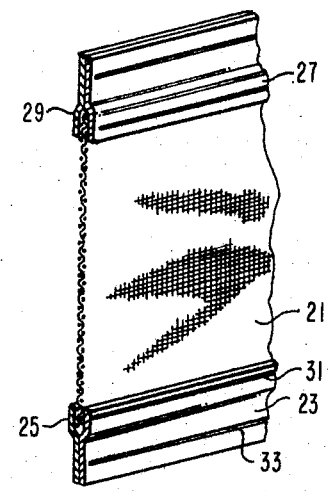
FIG.—3
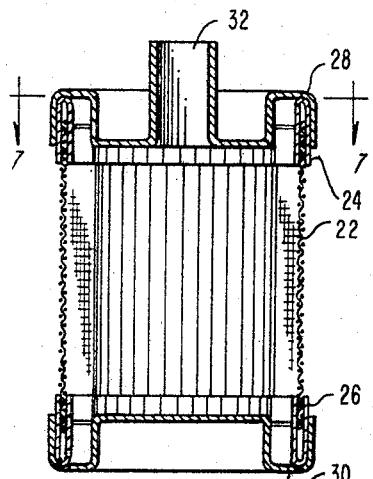
FIG.—4
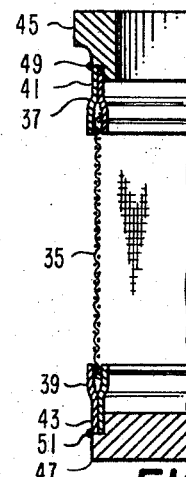
FIG.—5 FIG.—6 FIG.—9
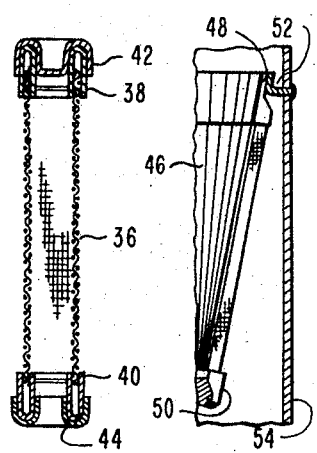
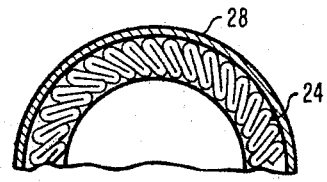
FIG.—7
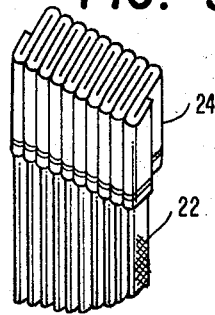
FIG.—8
INVENTOR.
JOHN P. WINZEN
BY Sanford Astor
ATTORNEY United States Patent Office 3,426,910
Patented Feb. 11, 1969

3,426,910
PLEATED METALLIC FILTER ELEMENT
John P. Winzen, 633 Ocean Ave., Santa Monica,
Calif. 90402
Filed Jan. 4, 1965, Ser. No. 422,966
U.S. Cl. 210—493       6 Claims
Int. Cl. B01d 35/28, 35/00

ABSTRACT OF THE DISCLOSURE

A filter element consisting of a metallic woven screen to the edges of which are attached metallic strips. This allows the screen to be fixed into a filter system, by attaching the strips to end caps, without danger of the screen being contaminated or damaged in the process of attachment to the end caps. Pleated filter elements may be made in this way, whereby the strips which overlap the edges of the metallic screen are crimped or welded to the screen and thereafter welded to the end cap. The screen will not be oxidized in the welding process and a completely leak-free filter is provided.

---

The present invention generally relates to a device including a porous matrix, suitable for mechanical filtration of fluids, gases or liquids, and a process for the insertion of a porous matrix into an operating system. More particularly, the present invention relates to a metallic woven screen suitable for filtration and a method for adapting a metallic woven screen into an operating system. The term "screen" as used herein comprehends any type of suitable porous matrix or porous metallic filtering media.

In the construction of assemblies, such as fluid filters, containing a porous matrix, such as a woven screen, one of the difficulties heretofore has been in obtaining a reliable leakage-free bond in the joints between the porous matrix and the connecting solid components, such as end caps.

These joints are usually made by brazing, a fusion welding or resistance welding. The completion of a structurally sound leak-proof joint by brazing has heretofore been quite difficult because of the capillary action of the porous matrix which soaks up the brazing alloy when heat is applied. This prevents the formation of uniform fillets particularly when pleated screen elements must be brazed to flat end caps. The time-temperature cycle, in order to employ brazing, must therefore be of short duration, ruling out furnace brazing, and the operation must be controlled by visual observation of the operator making control difficult.

In addition, the heating cycle required for brazing involves temperatures in excess of the oxidation point of stainless steels, and when wire screens are employed, a flux material must be applied to minimize discoloration. This flux must subsequently be removed and the element cleaned by methods which are costly and unreliable.

Resistance welding of a porous matrix, such as a wire screen, to solid parts is complicated by the difference in thickness between the solid and wire portions resulting in burning the screen before adequate penetration is obtained.

Fusion welding of wire screen to solid parts is also complicated by the difference in thickness between the screen wire and the solid parts. In the case of pleated or corrugated elements it has heretofore been the practice to squash the ends to reduce the section and to obtain a welded joint by applying the torch to the ends of the screen, burning them into a puddle to form a fillet, and machining the assembly to the desired dimensions. Squashing in this manner produces openings between the wires which are in excess of the hole size of the screen. Furthermore, by applying heat directly to the wires, oxidation occurs and fine wires are frequently burned, again opening holes in the screen in excess of the hole size of the screen. In addition, the excessive heat employed distorts the end caps to such an extent as to require machining of the fused assembly, in order to obtain the desired finished dimensions. This process introduces chips and other particles into and downstream of the matrix which are in excess of the desired filtration rating.

An additional problem which has heretofore been encountered is in the fabrication of pleated or corrugated elements of a porous matrix. Uniform spacing between the pleats is necessary to prevent unequal contaminant build-up during the service life of the element. Furthermore, because the porous matrix, such as wire mesh screen, is limp, it is difficult to guide the screen evenly into a pleating machine resulting in uneven edges. As an additional problem, the matrix is brought into contact with the folding blades of the pleater which introduces foreign particles into the pores of the matrix.

It is an object of this invention to provide a porous matrix which is capable of being joined to solid parts without the difficulties of the prior art.

It is a further object of this invention to provide a process for joining a porous matrix to an assembly without deformation or contamination of the porous matrix.

Another object of this invention is to provide a process for brazing a metallic screen to a solid part without the problem of capillary creep-up of the brazing alloy.

Another object of this invention is to make controlled atmosphere furnace brazing possible in the joining of a metallic screen to a solid part.

Yet another object of this invention is to provide a method for the effective resistance welding of a metallic screen to a solid part.

Still a further object of this invention is to provide a method of effectively fusion welding a metallic screen to a solid part, eliminating the necessity of squashing the screen and preventing the oxidation of the screen.

Still a further object of this invention is to provide a method of obtaining uniform spacing of pleats in a pleated or corrugated screen.

Some of the objects of the invention having been stated, other objects and features will become apparent from the following detailed description when read in connection with the accompanying drawings in which—

FIG. 1 is a perspective view of a porous matrix according to the present invention;

FIG. 2 is a perspective view of another embodiment of the present invention;

FIG. 3 is a perspective view of another embodiment of the present invention;

FIG. 4 is a cross-sectional view of an assembly comprising a porous matrix according to this invention;

FIG. 5 is a partial cross-sectional view of another assembly of the present invention;

FIG. 6 is a plan view of another embodiment of the present invention;

FIG. 7 is a sectional view taken on lines 7—7 of FIG. 4;

FIG. 8 is a perspective view of a portion of a pleated screen according to this invention.

FIG. 9 is a partial cross-sectional view of yet another assembly of the present invention.

Referring more specifically to the drawings, FIG. 1 illustrates a porous matrix 10 made of stainless steel for example, with overlapping strips of a solid material, such as stainless steel. One such strip 12 overlaps the lower or bottom edge of the porous matrix and another such strip 14 overlaps the upper or top edge. The strip is fixedly attached to the porous matrix by welds 15, 17 which may be any standard welding technique such as seam welding or overlapping spot welding.

FIG. 2 shows another embodiment in which a porous matrix 16 has a strip of solid material fixedly attached in juxtaposition to the porous matrix. One strip 18 adjoins the lower edge of the porous matrix; another strip 20 adjoins the upper edge of the porous matrix.

FIG. 3 shows a porous matrix 21 with solid strips 23, 25 in juxtaposition to the lower edge of the porous matrix and disposed on either side thereof and strips 27, 29 similarly at the top edge. Seam weld 31 fixedly attaches the strip to the porous matrix and seam weld 33 fixedly attaches the two overlapping strips together.

FIG. 4 shows a porous matrix 22 in a pleated or corrugated form. Solid strip 24 at the top and 26 at the bottom overlap the top and bottom edges of the porous matrix 22. The strips 24, 26 may be attached to matrix 22 by any one of the three methods shown in FIGS. 1, 2 and 3 prior to pleating.

End caps 28 and 30 are fixedly attached to the upper and lower edges of the porous matrix by fixedly attaching the caps 28 and 30, such as by brazing, to the strips 24 and 26. The end cap 28 contains a central conduit 32 for exit of the fluid passing through the porous matrix 22.

FIG. 5 shows an alternate device similar to FIG. 4 with a porous matrix 35 in a pleated form. Solid strips 37 at the top and solid strip 39 at the bottom overlap the top and bottom edges of the porous matrix 35. The outermost portions 41, 43 of the solid strips 37, 39 are crimped to reduce the pleat depth and so as to form a solid strip of pleats crimped togethed with the thinest section at the outer edges. End caps 45 and 47 are fixedly attached to the solid strips 37 and 39 at the crimped edges 41 and 43 by circumferential welds 49 and 51.

FIG. 6 shows another embodiment of the invention in which a porous matrix 36 is rolled in the form of a cylinder with overlapping strips 38 and 40 at the upper and lower edge of the matrix. End caps 42 and 44 are fixedly attached to strips 38 and 40.

FIG. 7 taken along lines 7—7 of FIG. 4 shows strip 24 in a pleated configuration and end cap 28.

FIG. 8 shows the screen 22 pleated with solid strip 24 fixedly attached thereto.

FIG. 9 shows another embodiment of the invention in which a porous matrix 46 in a pleated or plain form is formed into a cone with overlapping strips 48 and 50 at the upper and lower edges of the matrix, a solid plug, not shown, is inserted into the lower (small) end of the cone while a metal flange 52 is inserted over the outside of the upper (large) end of the cone, both plug and flange being fixedly attached to strips 50 and 48 respectively. The upper flange of the cone is subsequently fixedly attached into a section of tube or pipe 54.

The porous matrix of the present invention may be of any suitable material but is preferably a metallic wire such as stainless steel in the form of a mesh cloth. These wire mesh openings may be as small as about 5 microns wherein the cloth has about 1,500,000 openings per square inch. The mesh openings may be as large as about 100 microns and even larger if required.

The strips of solid material are preferably also metallic, such as stainless steel, and may be from about .001 inch thick to about .010 inch thick although this is not a critical feature. A thickness of about .005 inch is preferred. The strip may be attached to the mesh screen by overlapping and crimping to the screen. A more preferred method is to overlap the strip and weld it to the screen such as by resistance welding.

The strip of solid metal aids greatly in forming a pleated or corrugated filter element which is desirable in providing a large surface area for filtration. This type of element is particularly useful in the filtration of contaminants from hydraulic oils and various other fluid power systems of space vehicles and aircraft during ground check-out, pre-flight servicing or in-flight system operation. The presence of the thicker strip of solid material between each pleat allows the exact spacing of each pleat of mesh screen since the strip provides a spacer between each pleat.

The porous matrix may be incorporated into a filter system in the flat disc form or may be rolled into either a regular cylinder or a cylinder or cone with a pleated or corrugated circumference. When rolled into a cylinder or cone, the porous matrix or screen is welded such as by resistence welding along a longitudinal seam to close the cylinder.

The screen may then be easily attached into a system such as by fixedly attaching end caps to the strips of metal on the upper and lower edges. The presence of these strips makes possible the use of furnace brazing. In this method, a brazing alloy such as a nickel alloy, gold alloy or silver alloy may be employed. Other well known brazing alloys may also be employed. The metallic strip prevents capillary creep up for the brazing alloy during heating, and, therefore, allows the use of protective atmosphere furnaces, which makes the use of a protective flux unnecessary and leaves the screen free from contaminants which are found in filters of the prior art.

The brazing alloy is applied to the metallic strip or the end cap, or other end closure, and the screen and end cap are placed in a furnace for a period of time sufficient to braze these parts together. Brazing normally takes place at about 1000° F. to about 1900° F. although temperatures both higher and lower may be employed.

The time employed may vary from about 30 minutes to about 3 hours depending upon the type of brazing alloy, the type of material to be brazed, and the brazing temperature. Torch or induction brazing may also be employed, however furnace brazing is preferred since it requires less control by the operator and provides the means of maintaining a protective atmosphere (such as dry hydrogen or vacuum) during the heating cycle.

For certain operations brazing cannot be utilized for joining the porous matrix into the system since the fluid which is to pass through the matrix may be incompatible with the brazing alloy. In this instance, or if preferred, the screen and end cap may be joined by fusion welding or by resistance welding.

In using fusion welding, the metallic strip and end cap can be of the same thickness and chemical composition as the end cap weld and therefore may be fused together without filler rods. This completely eliminates distortion and the necessity of machining after welding. When stainless steel is utilized, the temperature employed is about 2400° F. Since the attached strip is fused rather than the screen itself, the problem of burning or oxidizing of the small wire strands of the matrix is eliminated. When fusion welding is employed on a pleated or corrugated screen it is preferred to crimp down and fuse the individual pleats at their outer edge along the solid metallic strip. This prevents deformation of the screen itself and insures the absence of any leakage between the edge of the pleats and the end caps to which they are fused.

Resistance welding may also be employed to attach the matrix to the end cap. An overlapping spot welding technique is preferred in order to insure the absence of any leakage between the pourous matrix or screen and the end cap.

Other common welding techniques such as electro-beam or ultrasonic welding may also be employed to join the porous matrix and the end cap since the presence of the solid metallic strip insures a structurally sound, clean and leakproof joint.

Having fully described the invention and its utilities, it is desired that the invention be limited only by the limited scope of the appended claims.

I claim:
1. A method of forming a filter means comprising the steps of providing a metallic filtering screen having op- posed first and second end portions and having an inner and an outer surface, providing at least one flat solid metallic strip juxtaposed to and at least partially overlapping said screen first end portion and said screen second end portion, welding said juxtaposed and overlapped metallic strips to said screen by a continuous weld which form a fluid-tight leakproof connecting seam, pleating said screen and said strips attached thereto, crimping the pleated strips along the outer edges to form flattened outer portions thereof, converting said pleated screen and said crimped strips into a cylindrical configuration, positioning an end cap with at least a portion thereof juxtaposed to the flattened outer portion of each strip, and metallically connecting said end cap portions to said outer portions of said strips by a leakproof connection.

2. A method as defined in claim 1 wherein said metallic connecting step consists of welding said end cap portions to said crimped strip portions.

3. A method as defined in claim 1 wherein said metallic connecting step consists of brazing said end cap portions to said crimped strip portions.

4. A filter means comprising:
a cylindrical metallic filtering screen having opposed end portions and having an inner and an outer surface;
solid metallic flat strip means configured in a cylindrical shape and juxtaposed to each of said end portions;
said strip means including a first section overlapping each end portion of said screen in juxtaposition to at least one of said surfaces of said screen, and a second section projecting beyond each end portion of said screen;
said strip means and said filtering screen being pleated;
said pleats along said second sections of said strip means being flattened;
continuous weld means connecting said screen to said first sections at each end thereof, said weld means extending continuously about said cylindrical screen to form a fluid-tight connection which assures that all of the substance being filtered by said filter means must pass through said filtering screen and none will leak through the connection between said first sections of said strip means and said screen;
end cap means disposed at opposite ends of said screen, including a substantially cylindrical surface juxtaposed to said flattened second sections of said strip means; and
means connecting each of said flattened second sections to a juxtaposed cylindrical surface of said end cap means to form a leakproof connection which prevents the substance being filtered from leaking between said end caps and said strip means and which thus assures that such substance will pass through said filtering screen.

5. A filter means as defined in claim 4 wherein said strip means includes a pair of strips at each end portion, one strip of said pair being juxtaposed to the inner surface of said screen and the other strip of said pair being juxtaposed to the outer surface of said screen, with each of said strips in said pair having their first sections connected by said continuous weld means to their associated screen surface.

6. A filter means as defined in claim 4 wherein said screen is pleated along its entire length.

References Cited

UNITED STATES PATENTS

| | | | |
|---|---|---|---|
| 690,524 | 1/1902 | Knight | 210—477 |
| 2,202,403 | 5/1940 | Sandberg | 210—499 X |
| 2,279,423 | 4/1942 | Vokes | 210—493 |
| 2,640,789 | 6/1953 | Hausner | 210—499 X |
| 2,663,660 | 12/1953 | Layte | 210—493 |
| 2,023,423 | 12/1935 | Kleckner. | |
| 2,743,019 | 4/1956 | Kovacs. | |
| 3,033,783 | 5/1962 | Lubben | 210—497 X |
| 3,165,473 | 1/1965 | Pall, et al. | 210—493 X |

SAMIH N. ZAHARNA, *Primary Examiner.*

W. S. BRADBURY, *Assistant Examiner.*

U.S. Cl. X.R.

210—497, 499